United States Patent [19]

Sato et al.

[11] 4,319,785
[45] Mar. 16, 1982

[54] VEHICLE WHEEL

[75] Inventors: Masahiro Sato, Asaka; Norio Tanaka, Toda, both of Japan

[73] Assignee: Honda Giken Kogyo Kabushiki Kaisha, Tokyo, Japan

[21] Appl. No.: 96,521

[22] Filed: Nov. 21, 1979

[30] Foreign Application Priority Data

Nov. 22, 1978 [JP] Japan .................. 53-161194[U]

[51] Int. Cl.³ .............................................. B60B 1/10
[52] U.S. Cl. .................................. 301/6 CS; 301/6 E; 301/64 SH; 301/67; 301/74
[58] Field of Search .................... 301/6 V, 6 E, 64 R, 301/64 SH, 64 SD, 67, 73-74; 306/6 CS

[56] References Cited

U.S. PATENT DOCUMENTS

| | | | |
|---|---|---|---|
| 1,403,121 | 1/1922 | Lachman | 301/64 R |
| 2,306,008 | 12/1942 | Watter | 301/64 R X |
| 3,623,774 | 11/1971 | Funke et al. | 301/64 R |
| 3,709,561 | 1/1973 | De Biasse et al. | 301/6 V X |
| 4,181,365 | 1/1980 | Kawaguchi et al. | 301/64 SH X |

FOREIGN PATENT DOCUMENTS 579814  10/1924  France ........................... 301/64 SH Primary Examiner—Charles A. Marmor
Attorney, Agent, or Firm—Irving M. Weiner; Pamela S. Burt; John L. Shortley

[57] ABSTRACT

A vehicle wheel including a rim, a hub, and a plurality of spoke plates connecting the rim and hub together. Each of the spoke plates comprises a pair of axially opposite plate members each including a pair of marginal edge portions turned at an angle to the plane of a web of the plate member, and directed away from the turned marginal edge portions of the opposite companion plate member. The turned marginal edge portions serve as reinforcing ribs for the spoke plates to thereby increase the mechanical strength and rigidity of the spoke plates.

6 Claims, 11 Drawing Figures

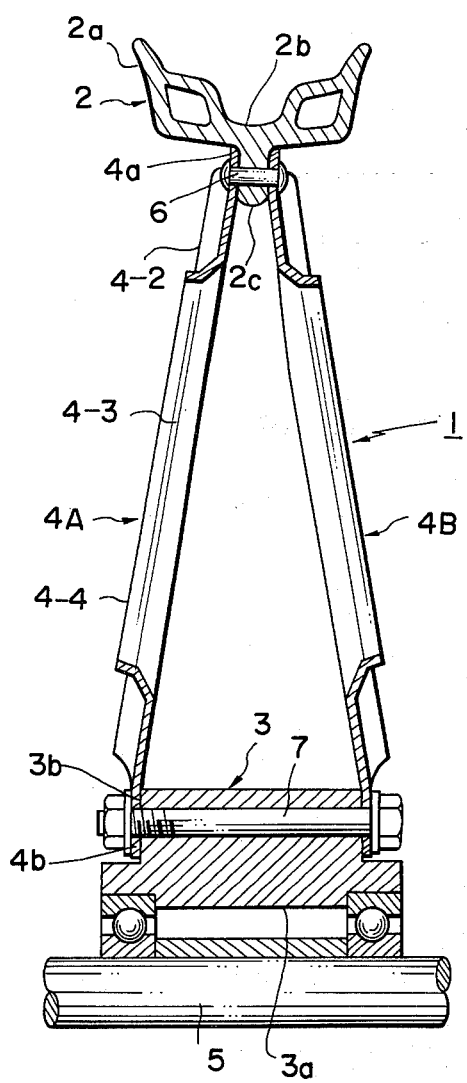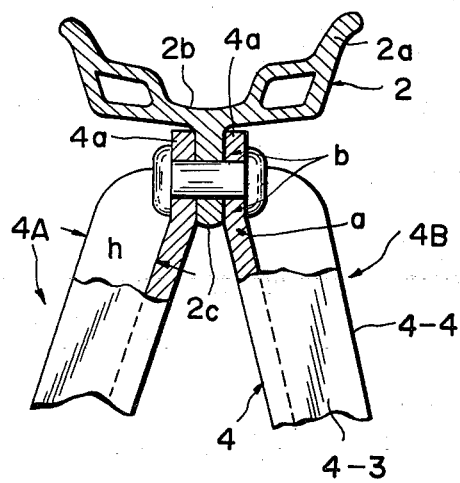

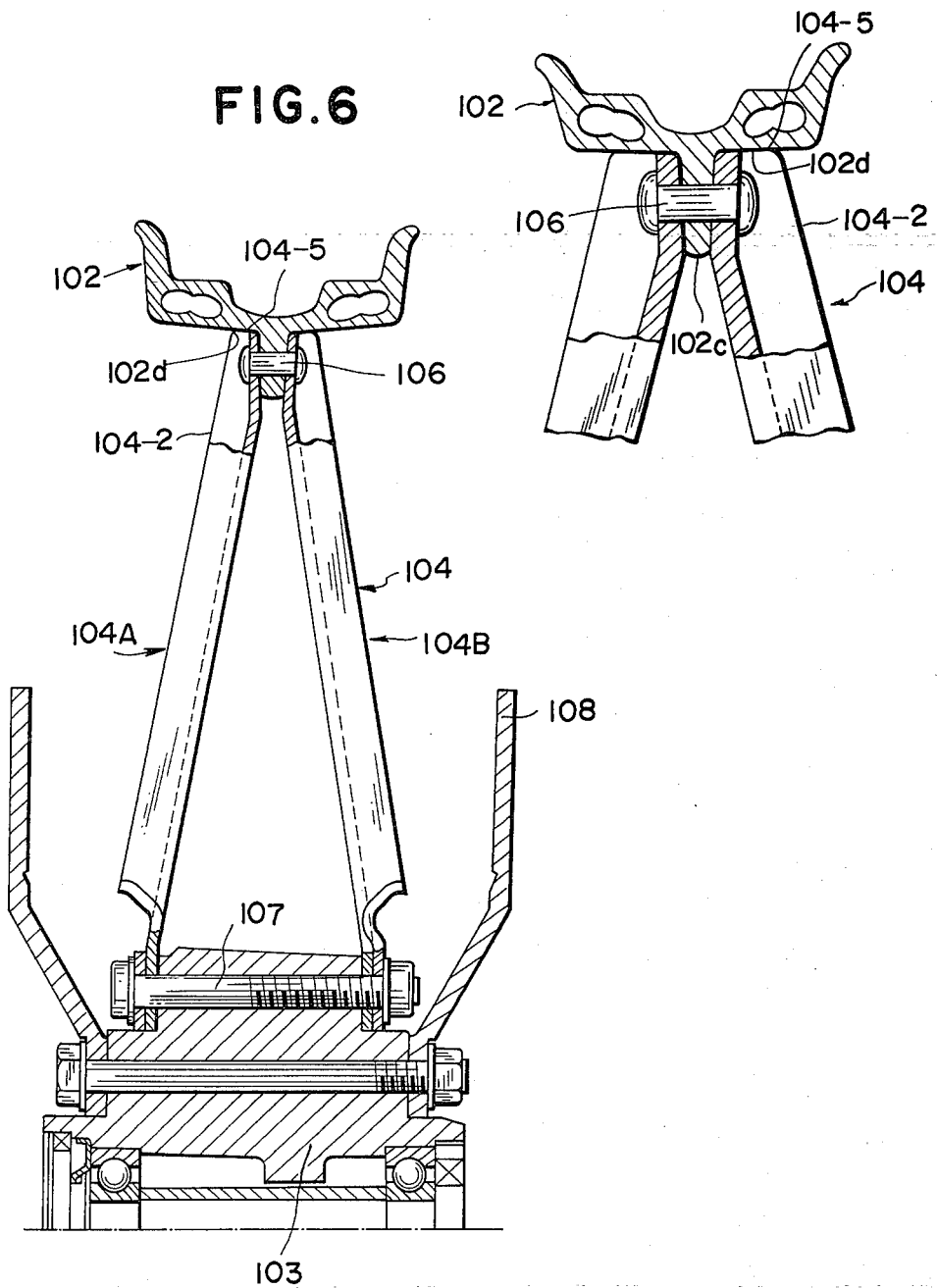

VEHICLE WHEEL

BACKGROUND OF THE INVENTION

The present invention relates generally to a wheel for vehicles such as motorcycles. More particularly, the invention relates to an improved wheel including a rim, a hub, and a plurality of spoke plates connecting the rim to the hub.

Generally, motorcycles have heretofore been equipped with spoked wheels. However, various problems are known to exist in connection with such spoked wheels. Because a multiplicity of spokes are employed, a great number of parts must be assembled together, and assembling the spokes is tedious and time-consuming. Further, the rim must be provided with a multiplicity of apertures for attaching the spokes, resulting in poor sealability, and a consequent difficulty in employing tubeless tires on the wheels.

A wheel construction has been disclosed in U.S. Pat. No. 4,181,365 (issued Jan. 1, 1980) to solve such problems. Such wheel construction comprises a rim, a hub, and a plurality of radially extending spoke plates connecting the rim to the hub and each including a pair of axially opposite plate members with first ends thereof connected to the rim and second ends thereof connected to the hub. The plate members must have a sufficient degree of mechanical strength and rigidity to bear the weight of the vehicle and withstand reactive forces from the road surface, including transversely imposed loads. One simple manner of meeting such a requirement would be to employ thick, rugged spoke plates, however, the weight of the wheel would necessarily become excessive, and the wheel would be difficult and expensive to manufacture.

SUMMARY OF THE INVENTION

It is an object of the present invention to provide a vehicle wheel which is light in weight and has a high degree of mechanical strength and rigidity.

Another object of the present invention is to provide a vehicle wheel which is so structured as to permit effective heat dissipation therefrom.

Still another object of the present invention is to provide a vehicle wheel which can be easily cleaned.

According to the present invention, each of a pair of axially opposite plate members forming one of a plurality of radial spoke plates connecting a rim and a hub together includes a pair of marginal free edge portions turned at an angle to a web of the plate member. The marginal free edge portions are directed substantially axially of the wheel and away from an identical pair of marginal free edge portions of an opposite companion plate member. The turned marginal edge portions serve as stiffeners or reinforcing ribs for the spoke plates, and radially outward ends thereof disposed at or beyond an area where the spoke plate and the rim are connected together preferably engage the inner periphery of the rim. With such reinforcing ribs, the spoke plates have a required degree of mechanical strength and rigidity in both transverse and longitudinal directions thereof, and can be constructed of strips which are as thin as possible, resulting in wheels which are light in weight. Because no projections exist between opposite spoke plate members, ready access is provided for removal of mud or stones which may become trapped between the opposite spoke plate members. The axially projecting ribs also function as cooling fins which assist in dissipating heat from heated tires and brake discs.

The above and further objects, features and advantages of the present invention will become apparent from the following description when read in conjunction with the accompanying drawings, which illustrate preferred exemplary embodiments of the present invention.

BRIEF DESCRIPTION OF THE DRAWINGS

FIG. 2 illustrates an enlarged vertical cross-sectional view of one-half of the wheel of FIG. 1.

FIG. 4 depicts an enlarged fragmentary view of a portion of the wheel shown in FIG. 2.

FIG. 5 is a view similar to FIG. 4, illustrating a modification thereof.

FIG. 6 is a view similar to FIG. 2, illustrating the modified wheel of FIG. 5.

DETAILED DESCRIPTION OF PREFERRED EMBODIMENTS

Figure 1:
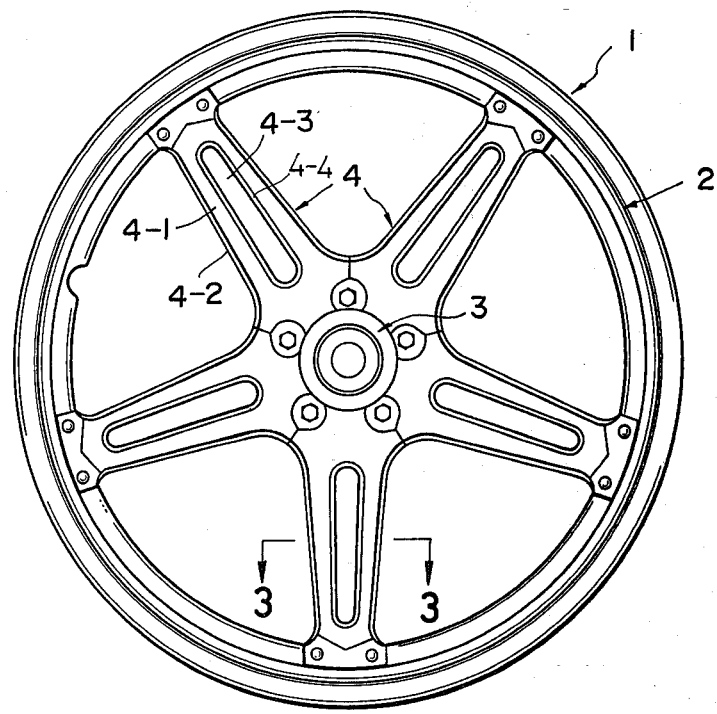
FIG. 1 depicts a front elevational view of a wheel in accordance with the present invention.

With reference to FIGS. 1 and 2, a wheel 1 particularly useful for use in motorcycles generally comprises a rim 2, a hub 3, and a plurality of spoke bars or plates 4 extending radially of hub 3 in relative angularly spaced relation, and connecting rim 2 and hub 3 together.

As shown in FIG. 2, the rim 2 includes a pair of radially outwardly projecting flanges 2a, 2a spaced from each other in the axial direction of wheel 1, and a centrally recessed portion or well 2b disposed radially inwardly of and between the flanges 2a, 2a. The rim 2 also includes an annular peripheral member 2c projecting radially inwardly from well 2b and functioning as a mount for the spoke plates 4. The hub 3 is provided with an axial center hole 3a for passage therethrough of an axle 5, and a pair of attachment shoulders 3b, 3b disposed at the axial ends of hub 3 and extending along circumferential edges of hub 3.

Each of the spoke plates 4 includes a pair of substantially identical plate members 4A, 4B (FIGS. 2 and 4) disposed in axially opposite relation, the plate members 4A, 4B comprising a pressed strip of steel. The plate members 4A, 4B include a pair of respective distal or radially outward end portions 4a, 4a positioned respectively on each side of the annular mount 2c and connected thereto by a rivet 6. The other end portions 4b, 4b of plate members 4A, 4B are disposed on the shoulders 3b, 3b, respectively, of the hub 3 and are connected thereto by a bolt 7 extending through hub 3.

As shown in FIG. 2, the plate members 4A, 4B are closer to each other at the distal end portions 4a, 4a thereof than at the end portions 4b, 4b thereof, so that the plate members 4A, 4B and the hub 3 jointly define a truss-like structure substantially in the form of an isosceles triangle.

Figure 3:
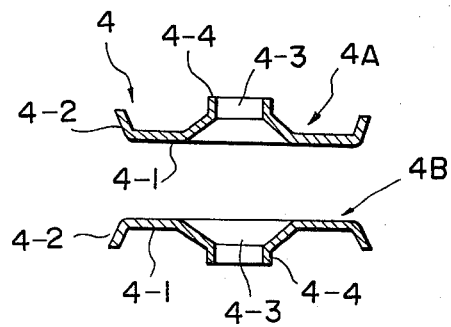
FIG. 3 is an enlarged cross-sectional view taken along line 3—3 of FIG. 1.

With reference to FIGS. 1–3, each of the plate members 4A, 4B includes a longitudinal central web 4-1 and a pair of longitudinal marginal free edges 4-2, 4-2 inclined at an angle to the plane of web 4-1 and projecting in the axial direction of wheel 1 away from the identical marginal free edges 4-2, 4-2 of the opposite, companion plate member. The marginal edges 4-2, 4-2 extend in the longitudinal direction substantially entirely along web 4-1. More specifically, the marginal edges 4-2, 4-2 extend from a point substantially adjacent hub shoulders 3b, 3b to a point just short of the distal end of web 4-1. Because the marginal edges 4-2, 4-2 are inclined with respect to web 4-1, they function as stiffeners or reinforcing ribs for the plate members 4A, 4B.

Because marginal edges 4-2, 4-2 of the plate members 4A project away from those of the companion plate member 4B, they do not interfere with each other or with the annular mount 2c. Further, the radially outward end portions of marginal edges 4-2, 4-2 are thus positioned one on each side of the distal end portions 4a, 4a, i.e., an area b (FIG. 4) at which each plate member is fastened to the rim 2. If desired, it is contemplated that such radially outward end portions of the marginal edges 4-2, 4-2 may even extend longitudinally beyond the fastened area b of the plate member to the rim. Accordingly, the plate members 4A, 4B have a greater degree of mechanical strength substantially along their length than they would have if the marginal edges 4-2, 4-2 of the plate members 4A, 4B extended toward each other and if their end portions teminated short of an area a (FIG. 4) corresponding to the lower end of mount 2c to avoid interference with the mount 2c, resulting in mechanical weakness at the bent area a.

With the arrangement of the present invention, the plate members 4A, 4B have a sufficiently high degree of rigidity and mechanical strength even if they are of a reduced thickness and are light in weight in comparison with conventional plate members which have heretofore necessarily been relatively thick and heavy in order to meet rigidity and strength requirements. The marginal edges 4-2, 4-2 according to the present invention can extend axially of the wheel 1 to the extent practically possible for added rigidity and mechanical strength. Such a structural arrangement is particularly advantageous in that the spoke plates 4 will be rigid and mechanically strong in the transverse direction thereof, in addition to the longitudinal rigidity and mechanical strength thereof. It is well known that the height or the degree of axial projection h (FIG. 4) of the reinforcing ribs 4-2, 4-2 govern the transverse rigidity of the spoke plates 4, which greatly affects the driving performance of the motorcycle. The height h of the reinforcing ribs 4-2, 4-2 of the present invention can be advantageously selected so as to provide the best structural and functional design of the wheel, and the best steering capacity of the motorcycle. Such advantages cannot be attained with a structural arrangement wherein reinforcing ribs of opposite plate members project toward each other.

The reinforcing ribs 4-2 projecting axially outwardly of wheel 1 function as cooling fins which provide an increased area for heat dissipation from the wheel 1, whereby assisting in cooling heated tires and brake discs so as to avoid the problem of excessive heating of the parts which might otherwise arise.

Because the reinforcing ribs 4-2, 4-2 of the opposite plate members 4A, 4B are directed away from each other, ready access can be gained to the area between plate members 4A, 4B for removal of any mud or stones which may become lodged therebetween. Further, because no projections or ribs exist between the plate members 4A, 4B, there is substantially no tendency for mud or stones to become trapped between the plate members 4A, 4B.

As shown in FIGS. 2 and 3, each plate member 4A, 4B includes a slot 4-3 defined by a flange 4-4 projecting from the web 4-1 on the same side as the ribs 4-2, 4-2. The slot 4-3 extends longitudinally of web 4-1 and terminates short of the end portions thereof. Due to the provision of slot 4-3, the plate members 4A, 4B are light in weight and have a favorable appearance. Further, the wheel 1 will thus be subjected to less transverse wind pressure because air flow passes through the slot 4-3 to thereby relieve the wheel 1 of possible transverse displacement. It is contemplated, however, that slot 4-3 may be eliminated such that the web 4-1 is substantially continuous, with no slot therein.

Figure 7:
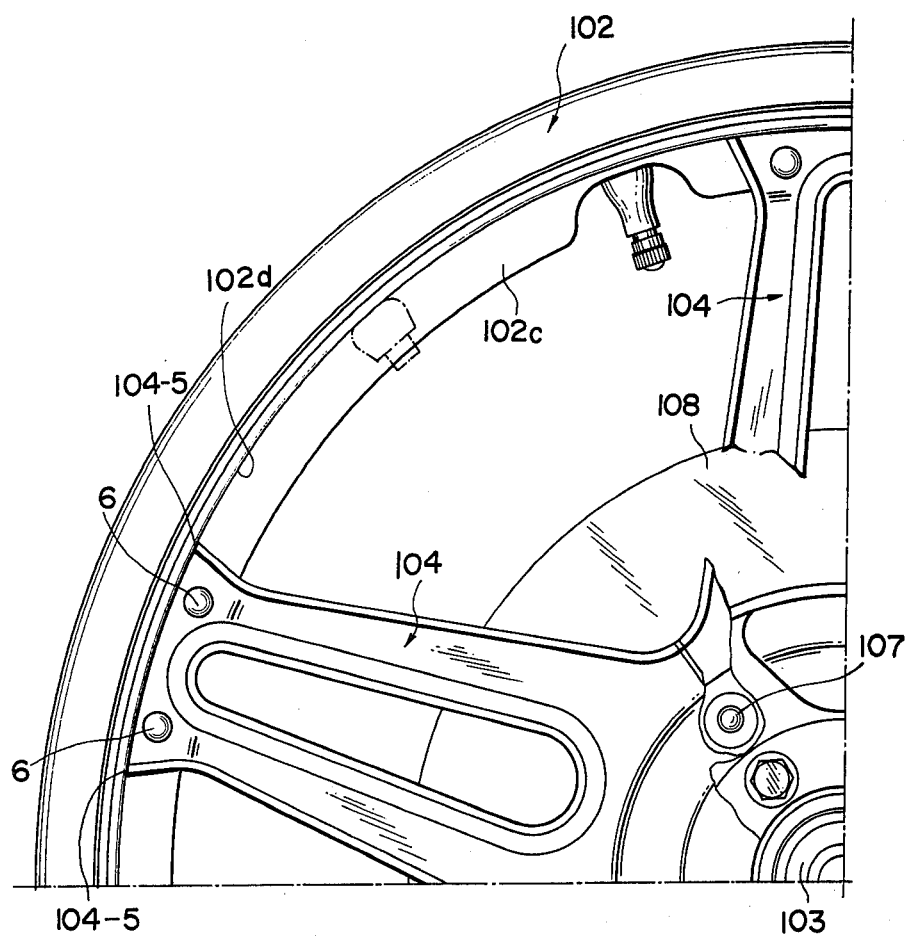
FIG. 7 depicts an enlarged quadrantal front elevational view of the wheel illustrated in FIG. 5.

FIGS. 5 through 7 illustrate a modified wheel in accordance with the present invention. In the embodiment shown in FIGS. 5 through 7, the same parts as those described hereinabove with reference to FIGS. 1–4 are indicated by like reference numerals with prefixes of 10, and will not be described in detail hereinbelow.

As illustrated in FIG. 5, the distal or radially outward ends 104-5 of the reinforcing ribs 104-2 of the spoke plates 104 extend longitudinally beyond the rivet 106 and into contact with inner peripheral surfaces 102d, 102d of the rim 102 on respective opposite sides of the mount 102c. With such an arrangement, the inner periphery of the rim 102 is engaged with the ribs 104-2, and the rim 102 is thus supported by the ribs. Forces tending to act transversely on and deform the mount 102c in the transverse direction of the wheel will be absorbed due to the engagement of the distal ends 104-5 of the ribs 104-2 with the inner peripheral surfaces of the rim 102. Thus, the possibility of the rim becoming transversely deformed is effectively eliminated.

With reference to FIG. 6, a pair of brake discs 108, 108 are disposed axially outwardly of the plates 104 and are cooled thereby. As shown, the radial inner ends of marginal edges 104-2 extend towards hub 103 beyond the outer peripheral end portions of brake discs 108 so as to thus greatly enhance the aforesaid cooling effect upon the brake discs 108.

Figure 8:
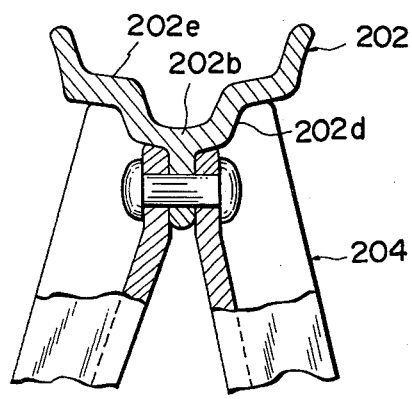
FIG. 8 is a view similar to FIG. 5, showing another modification in accordance with the invention.

FIG. 8 illustrates a rim 202 provided with a central well 202b bulging radially inwardly of the wheel, and a pair of humps or tire-bead receiving shoulders 202e, 202e. Distal ends of the spoke plates 204, 204 include shoulders which are shaped so as to conform to and mate with the cross section of the radial inner periphery of the rim 202.

Figure 9:
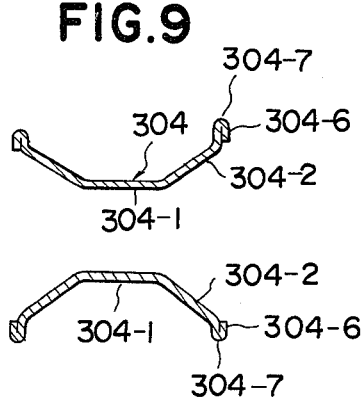
FIGS. 9 through 11 are transverse views of respective spoke plates provided with modified turned marginal edges.

In FIG. 9, each spoke plate member 304 includes a flat central portion 304-1 with no slot therein, and a pair of marginal edge portions 304-2, 304-2 each having a folded, overlapped edge portion 304-6 projecting substantially parallel to the axial direction of the wheel. A rounded edge 304-7 is directed axially outwardly of the wheel.

Figure 10:
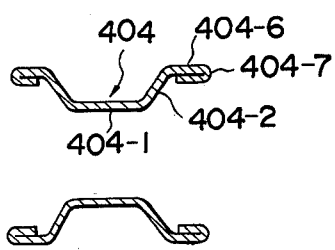

With reference to FIG. 10, each spoke plate member 404 includes a pair of inclined marginal portions 404-2, 404-2, each disposed on respective sides of a central web portion 404-1. Each of the marginal portions 404-2, 404-2 includes inwardly folded, overlapped edge portion 404-6 extending substantially parallel to the plane in which the central portion 404-1 extends. A rounded edge 404-7 is formed on each of the folded, overlapped edge portions 404-6.

Figure 11:
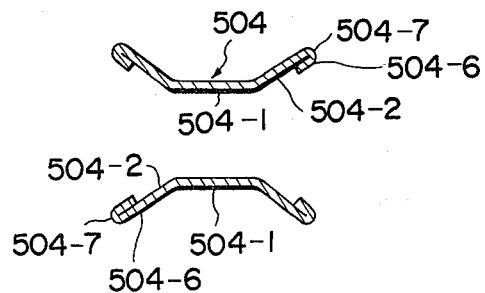

FIG. 11 illustrates a pair of spoke plate members 504, 504 each including a central web 504-1 and a pair of inclined marginal portions 504-2, 504-2. Each of the marginal portions 504-2, 504-2 includes an inwardly folded, overlapped edge portion 504-6 extending substantially parallel to the marginal portion 504-2 and including a rounded edge 504-7.

With the arrangements shown in FIGS. 9 through 11, the plate members can be manufactured by pressing only, without the need for cutting-off work. Thus, sharp edges and burrs will not be produced on the plate members. The folded edges provide a neat, aesthetically pleasing appearance, and result in an increased degree of mechanical strength and rigidity of the plate members along the edges thereof. Such structure is especially advantageous if the plate members are relatively thin.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:

1. A vehicle wheel comprising:
a hub;
a rim disposed concentrically around said hub; and
a plurality of radial spoke plates angularly spaced from each other and connecting said hub and said rim together, each of said spoke plates including:
a pair of axially aligned spaced plate members;
said pair of plate members being combined to form in a vertical cross-section a isosceles triangle, with the apex on the rim side and the base on the hub side, so that each said pair of plate members has a bent area adjacent an area at which said rim and said spoke plate are connected together;
each said pair of plate members comprising a central web and turned, longitudinal marginal free edge portions on both sides of said central web; and
said turned marginal edge portions being substantially directed away from the other one of said pair of plate members, substantially in the axial direction of said wheel, and extending substantially along said central web beyond portions corresponding to said bent area of said plate member on the rim side.

2. A vehicle wheel according to claim 1, wherein:
said turned marginal edge portions include longitudinal radially outward ends disposed at portions corresponding to an area at which said rim and said spoke plate are connected together.

3. A vehicle wheel according to claim 1, wherein:
said turned marginal edge portions include longitudinal radially outward ends extending beyond portions corresponding to an area at which said rim and said spoke plate are connected together, into abutting engagement with said rim.

4. A vehicle wheel according to claim 1, wherein:
said turned marginal edge portions are disposed axially inside of a pair of brake discs each disposed on respective axial sides of said hub such that said turned marginal edge portions include radially inner ends extending toward said hub beyond the outer peripheral end portions of said pair of brake discs.

5. A vehicle wheel according to claim 1, wherein:
said turned marginal edge portions include inwardly folded edge portions.

6. In a vehicle wheel comprising a wheel hub; a wheel rim having an annular projection on the inner surface thereof; a plurality of radial spoke plates angularly spaced from each other and operably connected to said wheel hub and said rim projection; each said spoke plate including a pair of axially aligned spaced plate members; and wherein said wheel hub, said rim projection and each of said pairs of plate members form in a vertical cross-section a triangle having said rim projection at the apex of said triangle and a portion of said wheel hub at the base of said triangle, such that each of said pairs of plates has a bent area adjacent an area at which said rim projection and said spoke plate are connected together, the improvement wherein:
each said pair of plate members comprises a central web and turned, longitudinal marginal free edge portions on both sides of said central web; and
said turned marginal edge potions are substantially directed away from the other one of said pair of plate members, substantially in the axial direction of said wheel, and extending substantially along said central web beyond portions corresponding to said bent area of said plate member on the rim side.

* * * * *